United States Patent [19]
Suga et al.
[11] Patent Number: 4,628,330
[45] Date of Patent: Dec. 9, 1986

[54] INK-JET RECORDING APPARATUS

[75] Inventors: Michihisa Suga; Mitsuo Tsuzuki, both of Tokyo, Japan
[73] Assignee: NEC, Japan

[21] Appl. No.: 822,695
[22] Filed: Jan. 24, 1986

Related U.S. Application Data

[63] Continuation of Ser. No. 724,047, Apr. 18, 1985, abandoned, which is a continuation of Ser. No. 449,620, Dec. 12, 1982, abandoned.

[30] Foreign Application Priority Data

Dec. 14, 1981 [JP] Japan ............................ 56-201270

[51] Int. Cl.[4] ............................ G01D 15/18
[52] U.S. Cl. ............................ 346/75; 251/129.01
[58] Field of Search ............................ 346/75, 140; 251/129

[56] References Cited

U.S. PATENT DOCUMENTS 2,887,294 5/1959 Hahn ............................ 251/129
3,055,631 9/1962 Kippenhan ............................ 251/129
3,621,967 11/1971 Brown ............................ 400/126
3,717,722 2/1973 Messner ............................ 346/75 X
3,943,527 3/1976 Hartmann ............................ 346/75 X
4,215,350 7/1980 Mielke ............................ 346/75
4,284,263 8/1981 Newcomb ............................ 251/129
4,353,078 10/1982 Lee ............................ 346/140
4,353,087 10/1982 Lee ............................ 346/140
4,378,564 3/1983 Cross ............................ 346/75

*Primary Examiner*—Joseph W. Hartary
*Attorney, Agent, or Firm*—Laff, Whitesel, Conte & Saret

[57] ABSTRACT

An ink-jet recording apparatus applies a pressure, which is higher than atmospheric pressure, to an ink supply. A recording head includes a nozzle for jetting ink droplets. A valve is disposed between the pressurized ink supply and the nozzle in order to control the ink flow to the nozzle. The valve is opened in response to a recording signal only when ink droplets are to be jetted from said nozzle.

1 Claim, 16 Drawing Figures

INK-JET RECORDING APPARATUS

Figure 1:
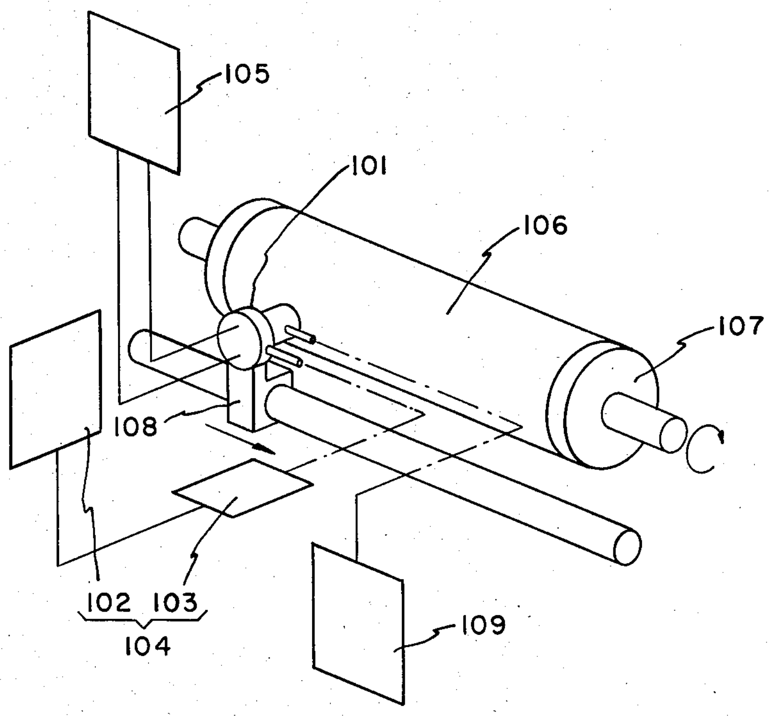

This is a continuation of U.S. patent application Ser. No. 06/724,047, filed Apr. 18, 1985, now abandoned; which is a continuation of U.S. patent application Ser. No. 06/449,620, filed Dec. 12, 1982, now abandoned.

This invention relates to an ink-jet recording apparatus and more particularly to an on-demand type ink-jet recording apparatus.

An on-demand type ink-jet recording apparatus is well known and has been used in a printer, facsimile equipment and the like. The ink-jet printer of the ink-on-demand type is described in detail, for example, in the U.S. Pat. No. 3,683,212 entitled "PULSED DROPLET EJECTING SYSTEM" issued to S. I. Zoltan, and in the U.S. Pat. No. 3,946,398 entitled "METHOD AND APPARATUS FOR RECORDING WITH WRITING FLUIDS AND DROP PROJECTION MEANS THEREFOR" issued to E. L. Kyser et al.

Many attempts have been made for putting the on-demand type of ink jet printer into practical use, because it can be realized by a comparatively simple arrangement. In the on-demand type printer, however, there is a practical limit in the rate of the supply of the ink, because the supply of the ink relies entirely upon the surface tension of the ink meniscus of the nozzle. It is extremely difficult to increase the number of ink droplets per unit time, i.e., the ink frequency, for achieving higher recording speed. A piezoelectric element is deformed by an application of an electric voltage thereto, but the deformation cannot take place in a manner which responds to a waveform of the applied voltage. In consequence, the piezoelectric element undertakes a free vibration in a vibration frequency range around its resonance frequency. When the number of ink droplets is increased, this free vibration and in the volume causes a change in the jetting velocity of the ink droplets. For these reasons, it has been quite difficult to effect the recording at a high speed and high quality with the conventional on-demand type ink jet head.

The Japanese Patent Disclosure No. 49273/80 discloses another recording head, in which a pressure wave is generated by a pressure means acting on the liquid filling a first chamber. The ink is jetted from a discharged orifice. In order to generate a pressure wave, an electric impulse is imparted to a piezoelectric element to deflect a diaphragm towards a third chamber in order to bring the first chamber into communication with a second chamber. Subsequently, the electric impulse is removed to reset and pressure means promptly, and to generate the pressure wave. Elastic members are clamped between the diaphragm and constituent parts of the printer, in order to prevent leakage of the fluid during the suspension of the operation of the pressure means and to prevent any secondary vibration of the pressure means.

However, it has been quite difficult to prevent any leakage of the liquid by the clamping of the elastic members during the suspension of the operation of the pressure means, while keeping open the communication between the first and second chambers during operation of the pressure means. Leakage occurs due to the following reasons. Namely, in order to prevent a leakage of the liquid, the pressure means presses the elastic member against the structural parts when it is not operating, so that the elastic members are elastically deformed. Therefore, in order to provide a communication between the first chamber and the second chamber, the operation of the pressure means requires its deformation by an amount which is greater than the amount of elastic deformation of the elastic members. However, when a piezoelectric element is used as the pressure means, the amount of deformation of pressure means is 1 μm or so at the greatest. It is quite difficult to satisfy both the demands of leakage prevention and of communication between two chambers, with such a small amount of deformation.

The generation of a pressure wave for discharging the ink relies upon the resetting force of the pressure means. This force is produced when the electric impulse applied to the piezoelectric element terminates. It is readily understood that the resetting force is decreased when the design is made such that a comparatively large deformation is obtained for a given level of electric impulse. The limit in the resetting force naturally limits the response speed in the discharge of the ink to make it difficult to operate the ink-jet recording apparatus at high frequencies.

An ink-jet recording apparatus, which is thought to achieve the highest performance is disclosed in the U.S. Pat. No. 3,596,275 entitled "FLUID DROPLET RECORDER" issued to R. G. Sweet. A nozzel on this apparatus jets the pressurized ink in the form of a column. An electric charge control is effected before the end of the ink column is divided into fine droplets. Then, a deflection control selects only the fine droplets which are necessary for making the recording. According to this system, however, only an extremely small part of the jetted ink is actually used in the recording, so that a pipe system is required to collect the large amount of ink which was not used in the recording. Also, a control means is required for charging and deflecting of droplets. As a consequence, the apparatus is complicated and expensive.

It is, therefore, an object of this invention to provide an on-demand type ink-jet recording apparatus which is capable of recording at a high recording speed with a simplified construction.

According to this invention, an on-demand type ink-jet recording apparatus maintains an ink pressure at a level which is higher than the atmospheric pressure. The ink is jetted from a nozzle by opening a valve between ink pressure means and the nozzle, only when a recording is required.

Figure 2:
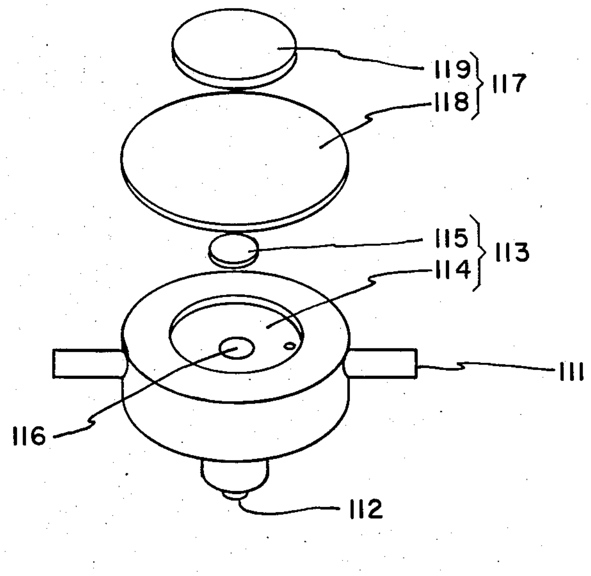
Figure 2B:
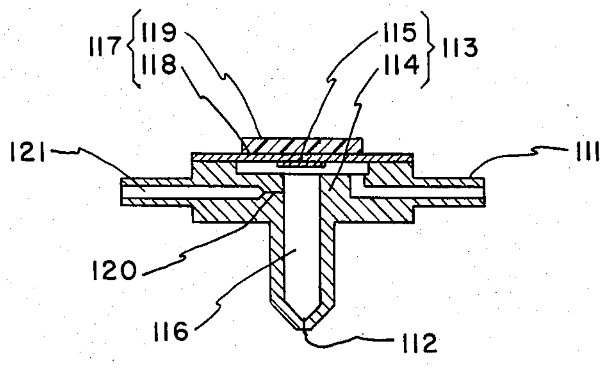
Figure 3A:
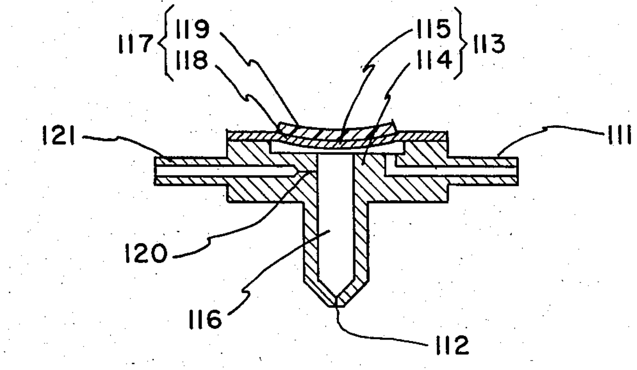
Figure 3B:
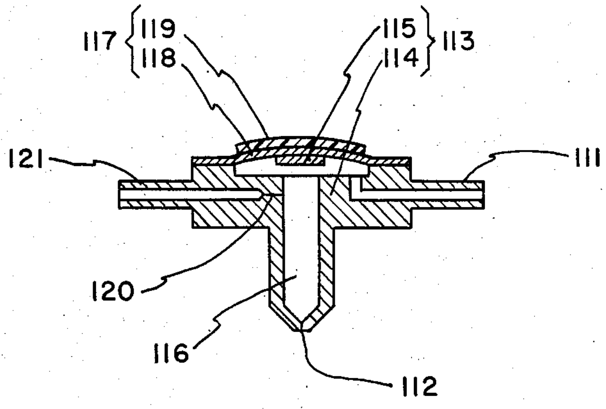
Figure 4:
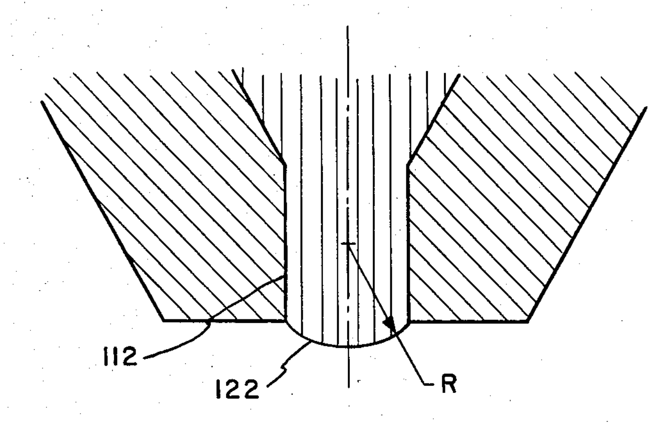
Figure 5A:
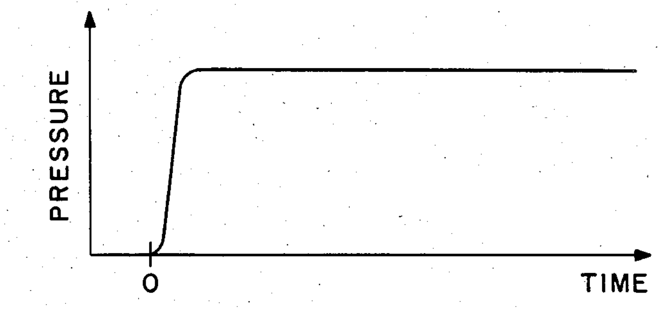
Figure 5B:
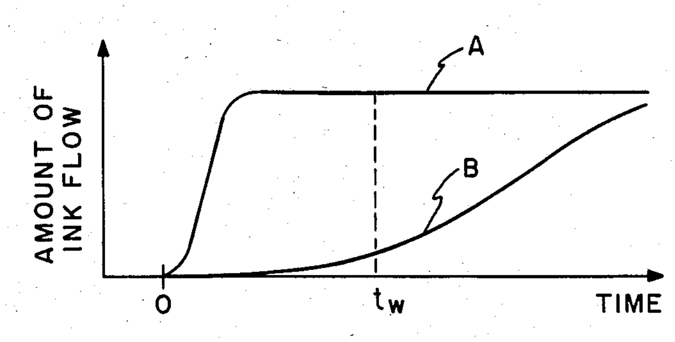
Figure 6:
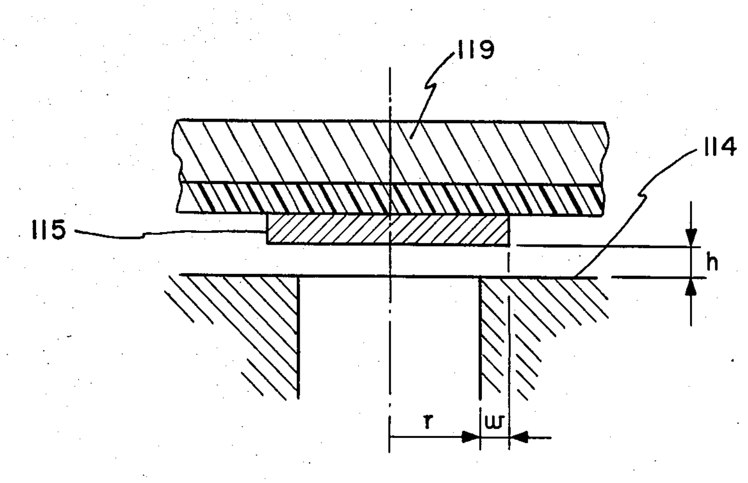
Figure 7A:
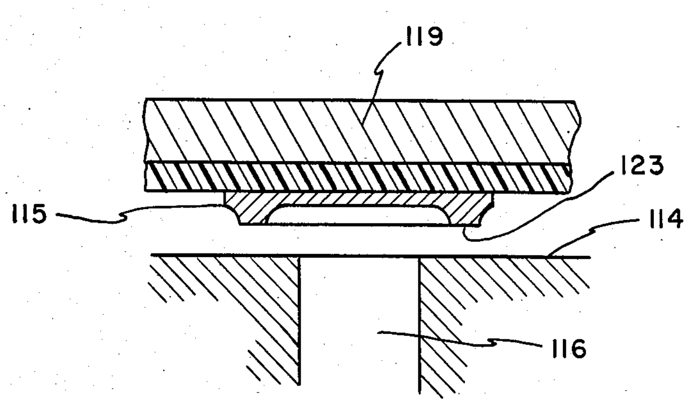
Figure 7B:
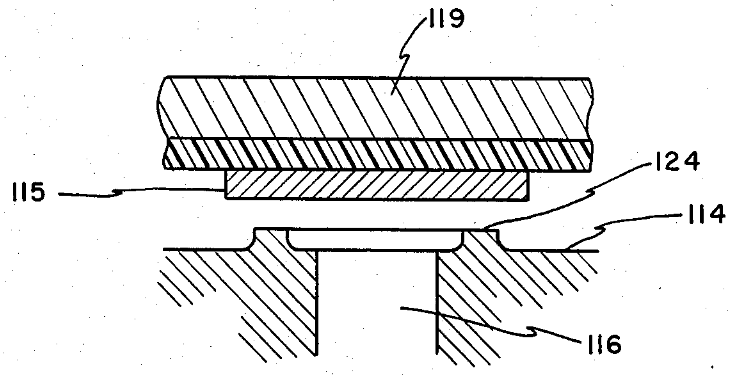
Figure 8A:
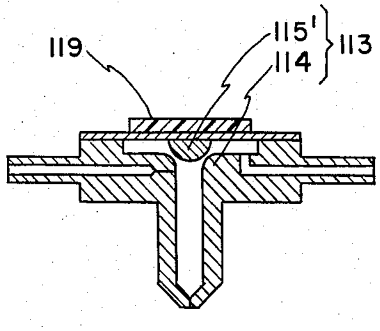

Other features and advantages of this invention will be apparent from the following description of preferred embodiments of this invention, taken in conjunction with the accompanying drawings, wherein:

FIG. 1 is a schematic illustration of an ink jet recording apparatus in accordance with a first embodiment of this invention;

FIGS. 2(*a*) and 2(*b*) are an exploded perspective view and schematic sectional view of the ink-jet recording head in the first embodiment;

FIGS. 3(*a*) and 3(*b*) are schematic, stop motion sectional views of the recording head for explaining the ink jetting operation;

FIG. 4 is a schematic sectional view for illustrating the form of meniscus formed on a nozzle portion;

FIGS. 5(*a*) and 5(*b*) show a change in ink pressure and a ink flow rate, in relation to time, in the ink jetting operation;

FIG. 6 is an enlarged sectional view of valve means for explaining the flow-rate characteristics in the valve means in the first embodiment;

FIGS. 7(*a*) and 7(*b*) are schematic sectional views of other embodiments of the valve means; and FIGS. 8*a* and *b*, 9*a* and *b*, and 10 are schematic sectional views of ink jet recording heads in accordance with still other embodiments.

Referring to FIG. 1, an ink-jet recording apparatus, according to a first embodiment of this invention, comprises an ink-jet recording head 101 including a nozzle for jetting ink in accordance with a picture signal. A valve means is adapted to be opened and closed by means of an electric-mechanical conversion means. An ink supplier 104 supplies ink at a high pressure to the ink jet head. This supplier 104 includes an ink pressure generating means 102 and a valve 103 for controlling the supply of the high pressure ink to the head 101. Voltage source 105 applies a voltage to an electro-mechanical conversion means in the head in order to open and close the valve means in the recording head 101, in response to the picture signal.

The recording head 101 has a discharging means which is adapted to discharge any ink leaking from the valve means in the head 101, when no ink jet is being made during the recording. This discharge prevents the ink from flooding from the nozzle. The ink discharged from the discharging means is collected at an ink pool 109.

The recording is effected by a combination of main scanning which is effected by rotating, at a constant speed, a drum 107 around which a recording paper 106 is wound. A subscanning is effected by moving a carriage 108, mounting the head 101.

Referring to FIGS. 2(*a*) and 2(*b*), in recording, the pressurized ink is introduced into an ink supplying passage 111 and is jetted from a nozzle 112. A valve means 113 is disposed in the ink passage between the ink supplying passage 111 and the nozzle 112 in order to control the jetting of the ink.

The valve means 113 is composed of a valve seat 114 defining a port or orifice of an ink passage 116 leading to the nozzle 112. A disc-shaped valve 115 is positioned opposing the valve seat 114 to cover the port of the ink passage 116. An electro-mechanical conversion means 117, for opening and closing the valve means 113, has a bimorph structure comprising a piezoelectric element 119 bonded to the diaphragm 118. The valve 115 is bonded and fixed to the diaphragm 118. The ink passage 116 has a discharging means 120 for absorbing the ink which may leak from the valve means 113 when it is closed during recording, so as to prevent the ink from flooding from the nozzle 112. The discharging means 120 is constituted by a fine hole communicating with the ink passage 116. The leaked ink is introduced to the outside of the head through the discharging passage 121.

When an electric voltage is applied to the piezoelectric element 119, the electro-mechanical conversion means 117 presses the valve 115 onto the valve seat 114, i.e. to close the valve means 113 as shown in FIG. 3(*a*). Then, the pressure of the ink supplied through the passage 111 is elevated by means of the pressure generating means 102 (FIG. 1) to a predetermined level, to get ready for jetting the ink droplets. In order to jet the ink from the nozzle 112 by opening the valve means 113 as shown in FIG. 3(*b*), the voltage applied to the piezoelectric element 119 is reduced to zero or, alternatively, a voltage of a reverse polarity is applied.

As a result, the jetting of ink is effected at the highest pressure of the ink supply. While the valve means 113 is in the open state, the ink jetting from the nozzle 112 continues. The amount of ink being jetted can be controlled by changing the open valve period by suitably controlling the length of time during which the voltage is applied to the piezoelectric element 119. There is a larger change in the amount of jetting ink as compared with the ink supplied by a conventional recording head. The reproducibility of intermediate tones is realized by changing the area of the ink dot formed on the recording medium. Both the volumn and tone of the ink recording can be improved remarkably.

In the ink-jet recording head shown in FIG. 2, the valve 115 is spaced away from the valve seat 114, namely, the valve means 113 is normally open, in the assembled state of the head. Therefore, it is necessary to close the valve means 113 by applying a voltage to the piezoelectric element 119. Clearly, the head can be constructed so that the valve 115 and the valve seat 114 are normally held closed, i.e. such that the valve means 113 is closed, in the assembled state of the head. The change to a normally closed valve may be accomplished by changing the size and shape of the constituent parts of the printer. In this case also, however, it is necessary to apply the voltage to the piezoelectric element 119 in a manner which presses the valve 115 against the valve seat 114 for effecting the jetting, as in the case of the recording head shown in FIG. 2. This is because the the high pressure ink is supplied through the supplying passage 111 during an operation which produces a force that expands the electro-mechanical conversion means outwardly, i.e. to move the valve 115 and the valve seat 114 away from each other. It is possible to keep the valve means 113 in the closed state even when the ink is supplied at high pressure, if the voltage is applied to the piezoelectric element 119 in the manner explained above.

The operation of the electro-mechanical conversion means 117 for jetting of ink droplets, as explained in connection with FIG. 3, is entirely different from that in the conventional on-demand type ink-jet recording head. In the conventional on-demand type ink-jet recording head, when the ink droplets are jetted, the electro-mechanical conversion means is deflected inwardly to reduce the internal volume of the ink chamber, and the amount of ink is reduced corresponding to the reduction in the internal volume, as the ink is jetted from the nozzle. In contrast, in the inventive recording head 101, the jetting of the ink droplets is made by expanding the electro-mechanical conversion means 117 outwardly as shown in FIG. 3(*b*) thereby to open the valve means 113.

In the valve means 113, it is important to increase the tightness of the contact between the valve seat 114 and the valve 115 to prevent any leaking of the ink. The perfect prevention of such leaking, however, encounters various problems because there is a necessity for high precision in the machining of parts and high precision of the assembling of the head.

It is, however, comparatively easy to sufficiently reduce the rate of this leakage of the ink, as compared with the flow rate of ink jetted from the nozzle 12. If the rate of leakage is maintained sufficiently small, the leaked ink is held by its own surface tension at the meniscus. Thus, the ink can be introduced to the outside of the head, through the discharge passage 121 without flooding from the nozzle 112. As shown in FIG. 4, the ink in the nozzle 112 forms a projecting ink meniscus 122, so that a pressure is produced by the surface tension of the ink to force it back into the nozzle 112.

Assuming that the ink meniscus 122 has a perfect spherical form, the pressure $P_M$ acting on the ink is expressed by the following equation.

$$P_M=2T/R$$

Where, R represents the radius of curvanture of the ink meniscus while T represents the surface tension.

The fact that the rate of leakage of ink in the valve means 113 is sufficiently small means that almost all of the high pressure of the ink in the supplying passage 111 is lost by the valve means 113. The ink pressure transmitted to the ink passage 116 via the valve means 113 is extremely low. When the pressure acting in the ink passage 116 is smaller than the pressure $P_M$, the ink does not flow out of the nozzle 112.

Then, as the valve means 113 is opened as shown in FIG. 3(*b*), the high ink pressure is directly applied to the nozzle 112 to cause the ink injection. Simultaneously, high ink pressure is applied to the jetting means 120 to increase the rate of the discharge of the ink. In order to maintain the amount of discharge of ink sufficiently small as the rate of ink jetting from the nozzle 112, it is necessary to make the flow resistance of the discharge means 120 sufficiently large, as compared with the resistance of the nozzle 112. The greater flow resistance can be obtained by reducing the cross-sectional area of the passage and increasing the length of the passage.

FIGS. 5(*a*) and 5(*b*) show the dynamic characteristics, i.e., the change in the pressure in the ink passage 116, which is observed when the valve means 113 is opened, and the changes in the flow rates of ink in the nozzle 112 and in the discharge means 120. In FIG. 5, the abscissa shows the time lapsed from the moment at which the valve means 113 starts to open. As will be seen from FIG. 5*a*, the pressure in the ink passage 116 rises to a constant value which is substantially equal to the ink pressure in the supplying passage 111 soon after the valve means 113 is opened. The flow rate of the ink jetted from the nozzle 112 is changed substantially, following the pressure change as will be seen from a curve A in FIG. 5(*b*). On the other hand, the increase of the ink flow rate in the discharge means 120 is very gentle, as shown by a curve B. This difference is attributable to the difference in the flow resistance. Namely, the change of the flow rate becomes gentle as the flow resistance becomes greater.

Referring to FIG. 5(*b*), the flow rate of ink discharged through the discharge means 120 is very small as compared with the rate of jetting of ink from the nozzle 112 at the moment $t_w$. As the time lapses from the moment $t_w$, the flow rate of ink discharged through the discharge means is increased also. However, it is possible to maintain the rate of discharge of the ink at a small amount as compared with the rate of jetting of ink, by making the period of opening of the valve means 113 sufficiently equal to or shorter than the time length $t_w$.

The ink-jet recording head 101 is preferably formed by a metallic material having a superior corrosion resistance such as nickel steel. The valve 115 and diaphragm 118 also are made of a metal having a sufficiently high corrosion resistance.

For instance, a superior droplet forming characteristics was confirmed with a head composed of a main body made of a stainless steel SUS303 and of the valve 115 and the diaphragm 118 made of a stainless steel SUS304. The electro-mechanical conversion means 117 was formed by bonding a disc-shaped piezoelectric element 119 of 10 mm dia. and 0.8 mm thick to a diaphragm 118 of 0.5 mm thick, the bonding being made by means of epoxy. The piezoelectric element 119 was made of N-21 which is a piezoelectric element (commercial name NEPEC) manufactured by Tohoku Kinzoku Kogyo K.K. The valve 115 is a disc having a diameter of 5 mm, and is bonded to the diaphragm 118 by means of epoxy, as in the case of the piezoelectric element. The diameter of the inlet port of the ink passage 116, which is adapted to be closed by the valve 115, is 4.9 mm. In this case, the width of the annular portion, at which the valve 115 closely contacts the valve seat 114, is 0.05 mm. In order to hold the valve means 113 in the closed state, when the ink of an elevated pressure of 1.5 atm. is applied to the head having the shape and size stated above, it was necessary to apply a voltage of −100 V to the piezoelectric element 119. Then, a voltage of 150 V was applied to the piezoelectric element 119 to open the valve means 113. In this state, the velocity of the jetted ink was about 10 m/sec. when the nozzle 112 of 60 μm dia. was used. The volume of the jetted ink was increased in accordance with the increase of the time width or period in which the valve means 113 is kept opened. The volume of jetted ink was about $7\times10^{-13}$ m$^3$ when the time width was 30 μm.

It is desirable for the pressure of the ink to be decreased as much as possible without being accompanied by any reduction in the rate of jetting of the ink. To this end, it is necessary to reduce as much as possible the pressure drop across the valve means 113, while in the open state. The pressure drop across a valve is affected by various factors such as the width w of the annular portion at which the valve 115 closely contacts the valve seat 114 and the gap h formed between the valve 115 and the valve seat 114 in the open state.

It is understood that the pressure drop P can be given by the following formula when the width w is sufficiently small as compared with the inside diameter r of the annular portion.

$$P=12\eta v/h^2\cdot w$$

In the formula shown above, P represents the pressure drop across the valve means 113, $\eta$ represents the viscosity of ink, and v represents the flow velocity of ink flowing through the gap between the valve and the valve seat. Generally, the size of the valve can be determined in accordance with the above formula to make the pressure drop sufficiently small for a given ink pressure. In order for the valve means to satisfactorily operate in the high-speed ink jet head, the width w and the gap height h preferably range between 1 μm and 100 μm and between 0.5 μm and 50 μm, respectively.

Referring to FIG. 7(*a*), an annular projection 123 is formed on the valve 115. In the closed state of the valve means 113, the projection 123 makes a close contact with the valve seat 114. The flow resistance of the open valve means 115 is determined mainly by the width of the projection 123 and the size of the gap between the projection 123 and the valve seat 114, as in the case of the recording head shown in FIG. 6. The inlet port of the ink passage 116 (FIG. 7) should be located at the inner side of the projection 123. The requirement for high precision assembly is not so severe if the inside diameter of the annular projection 123 is made greater than the inside diameter of the ink passage 116, which is interrupted by the valve 115.

It is necessary that the width of the annular projection 123 be determined in the same way as the determination of the lap width w in FIG. 6. The annular projection 123 should be determined minutely and accurately. Such a minute processing can be achieved by various known technics. For instance, typical minute processing methods which are effective in processing the valve are photoetching, electroforming, ion milling and so forth.

In the embodiment shown in FIG. 7(*a*), it is important for the width of lapping of the valve 115 and the valve seat 114 to be determined by the width of the projection 123. To this end, it is not necessary for the projection 123 to be formed on the valve. An equivalent effect is obtained even if the annular projection 124 is formed in the inlet end surface of the ink passage 116 corresponding to the valve seat 114, as shown in FIG. 7(*b*).

Figure 8B:
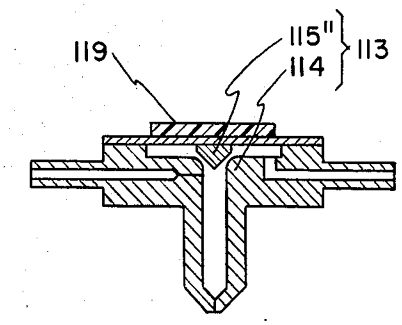

Referring to FIG. 8(*a*), a hemispherical valve 115′ is fitted in the valve seat 114 which is formed by conically cutting the inlet end of the ink passage 116. The radius of curvature of the valve 115′ rules the flow resistance of the valve means 113. More specifically, the flow resistance of the valve means 113 is increased as the radius of curvature is increased.

Referring to FIG. 8(*b*), a conical valve 115″ is adapted to make, for closing the valve means 113, a close contact with the valve seat 114 which is formed by conically cutting the inlet of the ink passage 116 conically.

In the ink jet heads shown in FIGS. 2 to 8, the piezoelectric element 119 may be substituted by an electric stain element. The bimorphs having a piezoelectric element or electric strain element bonded to the diaphragm is used as the electro-mechanical conversion means which is adapted to open and close the valve means in the ink jet head. The valve may be actuated by any electro-mechanical conversion means other than the bimorph employing a piezoelectric or electric strain element.

Figure 9A:
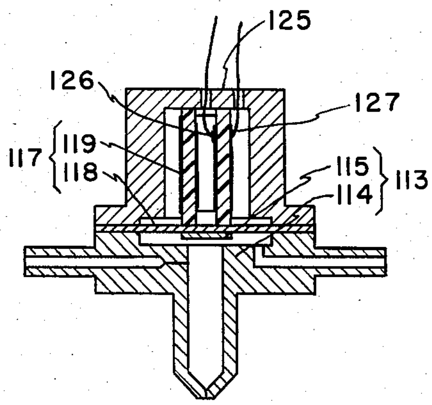
Figure 9B:
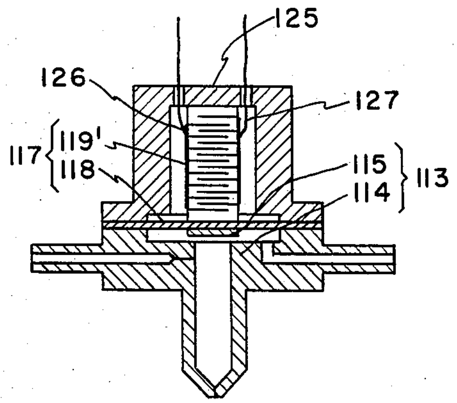

Referring to FIG. 9(*a*), a tubular piezoelectric element 119 is fixed at its one end to a fixing member 125 while the other end is bonded and fixed to one surface of the vibration plate 118, constituting a diaphragm. The valve 115 is fixed to the other surface of the diaphragm 118. Electrodes 126 and 127 are formed on the outer and inner wall surfaces of the tubular piezoelectric element 119. The opening and closing of the valve means 113 are effected by making use of a phenomenon wherein the length of the tubular piezoelectric element 119 is changed when voltage is applied between these electrodes. Needless to say, the tubular piezoelectric element may be replaced by an electric strain element having a similar shape.

Referring to FIG. 9(*b*), the tubular piezoelectric element [FIG. 9(*a*)] is replaced by a laminated piezoelectric element 119′. The laminated piezoelectric element 119′ is composed of a plurality of tabular or flat plate piezoelectric elements and electrodes alternately stacked in layers. Every two electrodes are connected to common lines so that two comb-like electrodes 126 and 127 are formed. When a voltage is applied between the electrodes 126 and 127, the length of the laminated piezoelectric elements 119′ is changed in the direction of lamination. The valve means 113 is opened and closed by making use of this length changing phenomenon. This change in length takes place as a result of the sum of thickness changes in all tabular or flat plate piezoelectric elements. It is possible to obtain a large change in length with a comparatively low voltage, by increasing the number of layers of the pizoelectric element.

As in the embodiments shown in FIGS. 2 to 8, the use of a bimorph as the electro-mechanical conversion means offers an advantage by causing a large stroke of the valve in the valve means. On the other hand, when a tubular piezoelectric element as shown in FIG. 9(*a*) is used, the stroke of the valve is not as large as that provided by the bimorf. However, the use of a tubular piezoelectric element facilitates the high-speed operation because the mechanical resonance frequency in the deformation of the tubular piezoelectric element is generally higher than that of bimorph. In this connection, the use of laminated piezoelectric element as shown in FIG. 9(*b*) is most preferred because it provides a large valve stroke and high resonance frequency in the deformation of the element. This arrangement, however, requires quite a large driving electric power because, in the laminated piezoelectric element, the electrostatic capacity between adjacent electrodes is extremely large.

Figure 10:
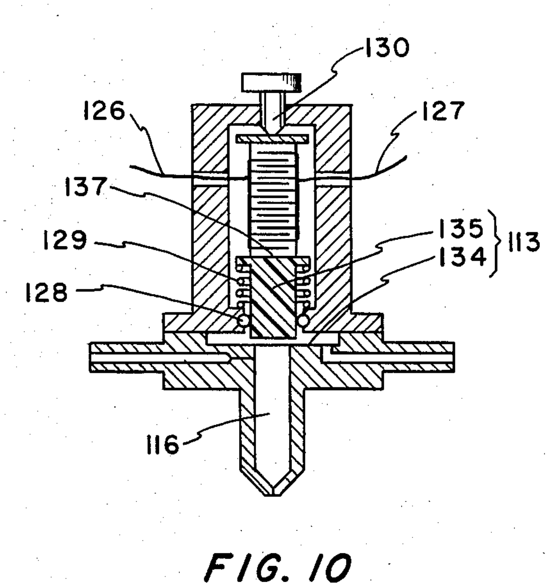

Referring to FIG. 10, there is no diaphragm which constitutes a wall of the ink chamber. A valve 135, which is directly connected to the electro-mechanical conversion means, is extended into the ink chamber through an "O" ring 128, by which the ink chamber is sealed from the outside, to shut the ink passage 116. The valve 135 and the electro-mechanical conversion means 137 are always biased in a direction to open the valve means 113 by the force of a spring 129. Therefore, the electro-mechanical conversion means 137 is always pressed against the pressing screw 130. A piezoelectric element of either the laminated type or the tubular type, as well as a electric strain element can be used as the electro-mechanical conversion means 137.

In this embodiment, it is possible to optimumly adjust the stroke of the valve 135, by the pressing screw 130. Namely, a D.C. voltage is applied between the electrodes 126 and 127 to maintain the greatest stroke length in the valve operating condition. In this state, the stroke of the valve 135 is optimized simply by rotating the pressing screw 130 so that the valve may completely shut the ink passage 116. Then, the voltage between the electrodes 126 and 127 is reduced to zero so that the length is reset to the original length. The valve 135 and the electro-mechanical conversion means 137 are forced back by the force of the spring to permit the valve 113 to open. In order to attain a high-speed operation, it is important to select the spring constant of the spring 129 at a level which is able to force back the valve 115 at a sufficiently high speed.

In the embodiments described above, the jetting of ink droplets from the nozzle is made at a sufficiently high ink pressure as compared with the pressure in the conventional ink on-demand type ink-jet recording head. Therefore, the unfavourable tendency of clogging a nozzle is reduced. Furthermore, since the volume of the jetted ink can be varied easily and widely by controlling the opening and closing period of the valve, it is possible to attain a control of thickness of recording through the change of area of recorded picture element, which in turn produces a recording of superior reproducibility of intermediate tone.

What is claimed is:

1. An ink on demand ink-jet printer for producing a recording responsive to picture signals, said printer comprising recording head means for directing ink toward a recording medium, said recording head means having a chamber with a jet nozzle leading directly out of said chamber with no intervening passageway between said chamber and said nozzle, pressurized ink supply means upstream of said head and coupled through a passageway leading into said chamber and jet nozzle, the pressure of said ink supply being greater than atmospheric pressure, valve means forming part of said chamber and being interposed in said ink passageway system between said supply means and said jet nozzle, said valve means comprising a diaphragm controlled by a piezoelectric means located on said diaphragm and operated responsive to picture signals for selectively operating said valve means to open said passageway to enable said pressurized ink supply to expel ink from said chamber and nozzle when said picture signals call for a deposit of ink on a recording medium, said valve means closing said passageway to terminate the expulsion of said pressurized ink when said picture signal does not call for a deposit of ink on a recording medium, said piezoelectric means causing said diaphragm to increase the volume of said chamber to open said valve so that said upstream ink supply may expel a drop of ink from said nozzle and decreasing the volume of said chamber to close said valve, and means extending from said chamber at a point between said diaphragm and said nozzle for scavenging any excess ink which may accumulate.

* * * * *